United States Patent [19]
Rosenblatt et al.

[11] Patent Number: 5,602,662
[45] Date of Patent: *Feb. 11, 1997

[54] CHOLESTERIC LIQUID CRYSTAL DEVICES

[75] Inventors: Charles Rosenblatt, Beachwood; Michael R. Fisch, Lakewood; Karl A. Crandall, Cleveland; Rolfe Petschek, Shaker Heights, all of Ohio

[73] Assignee: Case Western Reserve University, Cleveland, Ohio

[*] Notice: The term of this patent shall not extend beyond the expiration date of Pat. No. 5,477,358.

[21] Appl. No.: 389,316

[22] Filed: Feb. 16, 1995

Related U.S. Application Data

[63] Continuation of Ser. No. 81,009, Jun. 21, 1993, Pat. No. 5,477,358.
[51] Int. Cl.$^6$ ................................................. G02F 1/1337
[52] U.S. Cl. ................................................. 349/130
[58] Field of Search ............................ 359/77, 101, 105

[56] References Cited

U.S. PATENT DOCUMENTS

| | | | |
|---|---|---|---|
| 3,680,950 | 8/1972 | Haas et al. | 350/150 |
| 3,821,720 | 6/1974 | Groubel et al. | 340/173 |
| 4,068,925 | 1/1978 | Tani et al. | 359/105 |
| 4,252,417 | 2/1981 | Scheffer et al. | 350/349 |
| 4,326,279 | 4/1982 | Shanks | 368/240 |
| 4,973,138 | 11/1990 | Yamazaki et al. | 350/344 |
| 5,114,748 | 5/1992 | Tada et al. | 427/180 |
| 5,182,664 | 1/1993 | Clerc | 359/93 |
| 5,384,650 | 1/1995 | TeKolste et al. | 359/77 |

FOREIGN PATENT DOCUMENTS

| | | |
|---|---|---|
| 433999A2 | 6/1991 | European Pat. Off. . |
| 2531806 | 1/1976 | Germany . |
| 2007865 | 5/1979 | United Kingdom . |

OTHER PUBLICATIONS

Toko, Y. et al., *SID 93 Digest*, pp. 622–625 (1993).

Ogawa et al. *Electronics Letters*, vol. 12, No. 3, pp. 70–71 (1976).

Brokx and Vetogen, *Z. Naturforsch*, 38a, pp. 1–9 (1983).

Greubel et al., *Molecular Crystals and Liquid Crystals*, vol. 24, pp. 103–111 (1973).

Greubel *Appl. Phys. Lett*, vol. 25, No. 1, pp. 5–7 (1974).

Gerber, *Z. Naturforsch*, 36a, pp. 718–776 (1981).

Gray, *Chimia*, 34 No. 2, pp. 47–58 (1980).

*New Electro–Optical Effect: Optical Activity of Electric–Field Induced Twisted–Nematic Liquid Crystal* Electronics Letters, Feb. 5, 1976, vol. 12, No. 3 pp. 70–71.

Schiekel M. F. et al., *Applied Physics Letter*, vol. 19, No. 10, pp. 392 (1971).

Primary Examiner—William L. Sikes
Assistant Examiner—Charles Miller
Attorney, Agent, or Firm—Watts Hoffmann Fisher & Heinke

[57] ABSTRACT

A liquid crystal cell including chiral nematic liquid material with negative dielectric anisotropy. The cell is placed between two orthogonal polarizers. In the absence of an applied field, the liquid crystal molecules assume a homeotropic alignment. The liquid crystal molecules assume a twisted pattern in the field-on state.

14 Claims, 7 Drawing Sheets

CHOLESTERIC LIQUID CRYSTAL DEVICES

This application was made in part with Government support under cooperative agreement number DMR 89-20147 and DMR 90-20751 awarded by the National Science Foundation. The Government has certain rights in this invention.

This application is a continuation of earlier filed U.S. application Ser. No. 08/081,009, filed Jun. 21, 1993, under 35 USC §120 now U.S. Pat. No. 5,477,358.

BACKGROUND OF THE INVENTION

Flat panel liquid crystal displays are important components in display technology. Because of their relatively low cost and high definition, twisted nematic (TN) and supertwisted nematic (STN) cells, ferroelectric liquid crystals and liquid crystal-polymer dispersions have been used in a variety of display applications. Each of the foregoing technologies has drawbacks. Both TN and STN cells require complicated surface treatments which add to the difficulty and expense of their manufacture. Since TN cells inherently exhibit remnant birefringence near the cell surfaces, their dark state is not typically very dark. To obtain good contrast TN and STN cells may require an additional retardation or compensation layer which further adds to the difficulty and expense of their manufacture. Ferroelectric liquid crystals also require delicate surface treatments and are susceptible to mechanical shock which limits their application. The polymer required for polymer-liquid crystal displays adds to their cost and complicates their manufacture. The instant invention provides an economical alternative to such technologies having the advantages of low cost, a very dark off-state, a bright on-state, excellent contrast, the possibility for inherent color transmission and, for certain applications, low threshold switching voltage.

DISCLOSURE OF THE INVENTION

The invention is directed to new liquid crystal display technology employing chiral nematic liquid crystal having negative dielectric anisotropy. The invention provides an economical substitute for TN and STN cells and has a number of advantages thereover. First, the device relies on homeotropic surface alignment, which is much simpler to obtain than the homogeneous surface alignment required for TN cells. This reduces the number of processing steps, rendering the device both easier and cheaper to manufacture because no mechanical buffing is required. Second, the dark or opaque "off" state of the inventive devices exhibits excellent extinction and has no remnant birefringence for normally incident light. Thus, the opaque state is much darker than that exhibited by TN cells and does not require a positive retardation layer. Third, the device can be adjusted to achieve vanishingly small threshold voltage and can exhibit grey scale. Fourth, the contrast ratio of collimated light, which is the ratio of transmitted intensity at a field on voltage to transmitted intensity in the absence of a field, can be over 3000:1 for normal incidence, which is far superior to most TN cells. Moreover, these contrast ratios are exhibited in a light on dark display. Finally, in certain configurations, preferential transmission of color is possible where the color depends on the applied voltage. By adjusting the cell parameters the devices can be used in a number of display applications and be significantly more cost effective than currently existing technologies.

As described above, the invention is based upon a chiral nematic liquid crystal material having negative dielectric anisotropy. For a sufficiently thin cell having surfaces treated to promote homeotropic alignment of the liquid crystal, the helical pitch of the chiral material unwinds and the liquid crystal exhibits a uniform homeotropic alignment substantially throughout the cell. If the pitch is adjusted so that the liquid crystal director undergoes an approximately 90° azimuthal rotation across the width of the cell, the device can be operated as a high contrast ratio light shutter. At zero voltage the molecules are oriented homeotropically so that when interposed between crossed polarizers, normally incident light will not pass through the cell. The field-off state of the inventive cells is darker than is ordinarily found in the TN or STN cells because there is no in-plane birefringent layer at the surfaces.

At a sufficiently high voltage the liquid crystal assumes a nearly pure helical twist with the director over most of the interior of the cell nearly parallel to the cell walls. Polarized light passing through the liquid crystal material will undergo a combination of retardation, and rotation through an angle close the azimuthal rotation of the liquid crystal, about 90°, and emerge through the crossed polarizer.

In accordance with the foregoing, one embodiment of the invention provides a liquid crystal display device comprising cell walls and a chiral nematic liquid crystal material disposed between the cell walls. The cell walls include means for electrically addressing the liquid crystal material and means for plane polarizing light passing therethrough. Each of the polarizers is oriented to pass a polarization of light substantially perpendicular to the polarization of light passed by the other polarizer, i.e. the polarizers are crossed. The cell walls are also treated to promote homeotropic alignment of the liquid crystal material. In the preferred embodiment, only homeotropic alignment is induced by the surface treatment. The liquid crystal material has negative dielectric anisotropy and includes a sufficiently low amount of chiral material to enable the liquid crystal director throughout the cell to homeotropically align in the absence of a field. In one embodiment the cell walls are spaced apart by a distance of approximately 3/2 the pitch length of the chiral nematic liquid crystal to minimize the threshold voltage. In a preferred embodiment the liquid crystal material has a pitch length effective to rotate light passing through the cell approximately 90° in the presence of an electrical field. This corresponds to a pitch of approximately four times the cell thickness. Preferably, the pitch length is about 2.4 to 12, and more preferably about 2.4 to 4.0 times the cell thickness. In another embodiment the cell thickness is adjusted so that any optical retardation between two possible polarization eigenmodes is between about 175° and 585°. To maximize transmission, the phase shift is preferably approximately to an integral multiple of $2\pi$, i.e., 360°.

In another embodiment at least one of the cell walls is treated to promote a preferential orientation of the azimuthal tilt of adjacent liquid crystal molecules, preferably parallel to the orientation of one of the polarizers. In a preferred embodiment the cell wall is treated to promote preferential orientation by blowing freon with glass spacers across the surface of the wall at an angle with respect to the cell normal. Other means of preferentially orienting the azimuthal tilt may include angular deposition of SiO followed by a surfactant, or by rubbed polymer followed by a surfactant.

The chiral nematic liquid crystal is a mixture of nematic liquid crystal having negative dielectric anisotropy and chiral material in an amount sufficient to produce a desired pitch length. Suitable nematic liquid crystals and chiral materials are commercially available and would be known to those of ordinary skill in the art in view of this disclosure. The amount of nematic liquid crystal and chiral material will vary depending upon the particular liquid crystal and chiral material used, as well as the desired mode of operation and cell thickness. One of ordinary skill in the art will be able to select appropriate materials for the invention based upon general principles of chiral doping of liquid crystals to obtain optimum pitches, for example, the procedures taught in the manual distributed by Hoffmann-La Roche, Ltd., entitled *How to Dope Liquid Crystal Mixtures in Order to Ensure Optimum Pitch and to Compensate the Temperature Dependence*, Schadt et al., (1990), incorporated herein by reference. For high contrast light shutters the percentage of chiral material should generally be selected so as to produce a 90° rotation of the director across the thickness of the cell, although special applications can be achieved by varying the amount of chiral material.

Suitable surface treatments for promoting homeotropic alignment of the liquid crystal are also known to those of ordinary skill in the art and include silanes and surfactants. One suitable surfactant is hexdecyltrimethylammonium bromide (HTAB).

The cell may be addressed by any means known to those skilled in the art such as an active matrix, a multiplexing circuit and electrodes. Suitable polarizers are also commercially available and would be known to those of ordinary skill in the art in view of this disclosure.

In carrying out the invention, the cell substrates are prepared and then partially sealed around their edges with, for example, epoxy or other material in the usual way. The solution containing the desired amounts of nematic liquid crystal and chiral material is prepared and introduced between cell substrates. The cell can be filled by methods known to those of ordinary skill in the art, such as by capillary action. A preferred technique is to vacuum fill the cells. This improves cell uniformity and eliminates bubbles in the cell. For electrically addressable cells the cell walls are coated with transparent electrodes, such as indium tin oxide, prior to the introduction of the liquid crystal.

While not wanting to be bound by theory, a cell according to the invention can exhibit a vanishingly small threshold voltage because of a modification of the cell parameters. Upon application of an electric field perpendicular to a cell treated for homeotropic alignment of a chiral nematic liquid crystal having negative dielectric anisotropy, there are three terms or aspects characterizing the free energy in the cell. Taken together, the pair of bend elasticity, which favors homeotropic alignment, and negative dielectric susceptibility anisotropy, which favors a molecular orientation parallel to the cell surfaces, gives rise to the known Freedericksz transition, i.e., the transition that occurs at some threshold voltage where the field, which wants to distort the liquid crystal, overcomes the elastic energy. However, a chiral material also has a ground state twist. Given the initial homeotropic alignment, the only way for the liquid crystal to lower its energy and achieve a twist is for it to first exhibit bend distortion. Thus, both the electric field and the chiral material's propensity to twist compete with the bend elasticity and lower the threshold voltage. Unlike an ordinary twisted nematic cell in which the threshold voltage ($V_{th}$) is independent of sample thickness, $V_{th}$ in the instant devices is a function of the ground state pitch $P_{bulk}$, the sample thickness d and the ratio of the twist to the bend elastic constant. $V_{th}$ for such a cell can be made vanishingly small when the pitch is approximately 1.5×d.

In another embodiment, the intensity and uniformity of transmission from the cell can be maximized by adjusting the cell parameters. Excellent transmission can be obtained from such a cell when the pitch is effective to rotate polarized light passing through the cell by approximately 90° and the cell is of a thickness such that any optical retardation between polarization eigenmodes is approximately an integral multiple of 360°. For $V<V_{th}$ polarized light entering the cell sees a homeotropic orientation and is neither rotated nor retarded. Thus, the light does not pass through a crossed polarizer on the opposite side of the cell and the device is dark in the field-off condition. Since there is no remnant birefringence in the cell, the field-off state is exceptionally dark for normally incident light without the need for any retardation layer.

For $V>V_{th}$ a tilt of the director relative to the layer normal occurs. In addition, the director exhibits a helix having an axis parallel to the substrate normal. Polarized light is both retarded and rotated thus allowing light to pass through the crossed polarizer. Since the molecules have a negative dielectric anisotropy there is a $2\pi$ azimuthal tilt degeneracy for $V>V_{th}$, i.e., the director tilts by a polar angle $\phi$ with respect to the cell normal, and the projection of the director in the plane parallel to the cell walls can have any orientation. It will be seen that at higher voltages this has virtually no effect on the perceived transmission from the cell. However, at lower voltages just above $V_{th}$ the cell exhibits Schlieren-like textures.

Close to the cell surface where the molecular director is not exactly parallel to the cell surface the azimuthal orientation of the director varies from point to point across the face of the cell. When there is no preferential azimuthal orientation the director can assume any azimuthal direction. When the azimuthal orientation of the director is neither parallel nor perpendicular to one of the polarizers, the electric field vector emerging from the polarizer will be split into two components, called eigenmodes. Each eigenmode will rotate with the director and emerge at the opposite side of the cell. Moreover, each eigenmode will travel through the cell at its own velocity so that there will be a phase shift, i.e., retardation, between the two eigenmodes which gives rise to elliptically polarized light. However, where the azimuthal orientation is parallel or perpendicular to the polarizer, the electric field vector is not split into two eigenmodes. A single eigenmode of linearly polarized light will be rotated approximately 90° across the cell and emerge from the crossed polarizer.

If care is not taken to adjust the overall phase shift between the two eigenmodes occurring in the regions where the director is neither parallel nor perpendicular to a polarizer to approximately some integral multiple of 360°, there will be a decrease in the amount of light transmitted through the cell in these regions and textures will appear.

For a given cell, the intensity and uniformity of transmission can be maximized by adjusting the cell thickness so that the phase shift between the two eigenmodes is approximately an integral multiple of 360°. In this condition linearly polarized light rotated by approximately 90° emerges from the crossed polarizer. Thus, where the retardation is approximately some multiple of 360° allowing for maximum transmission of light from those regions where the director is neither perpendicular or parallel to a polarizer, the contrast associated with the textures becomes quite small and the cell appears nearly uniformly bright. However, if maximum transmission is not required, retardation ranging from about 175° to 585° may be useful depending on the cell and the application to which it is put.

The inventors have discovered that for a given birefringence one can adjust the cell thickness to meet a desired retardation condition, including the maximization of the transmitted light intensity. Moreover, if the azimuthal tilt at one surface is arranged to be parallel to the polarizer, a so called easy axis, there is negligible surface birefringence and only one eigenmode exists, so that the problem of the two eigenmodes disappears entirely. Treatment of one surface to provide an easy axis whereby the molecules tilt along a preferred direction will also function to reduce or eliminate the formation of the textures. Liquid freon filled with glass spacers blown over the surfactant at an angle, such as about 35° from the cell normal, can provide such an easy axis. Other possibilities include mechanical rubbing, deposition of a very small amount of polymer, and the use of other surface treatments such as silanes.

Many additional features, advantages and a fuller understanding of the invention will be had from the following detailed description of preferred embodiments and the accompanying drawings.

DETAILED DESCRIPTION OF THE PREFERRED EMBODIMENTS

Figure 1:
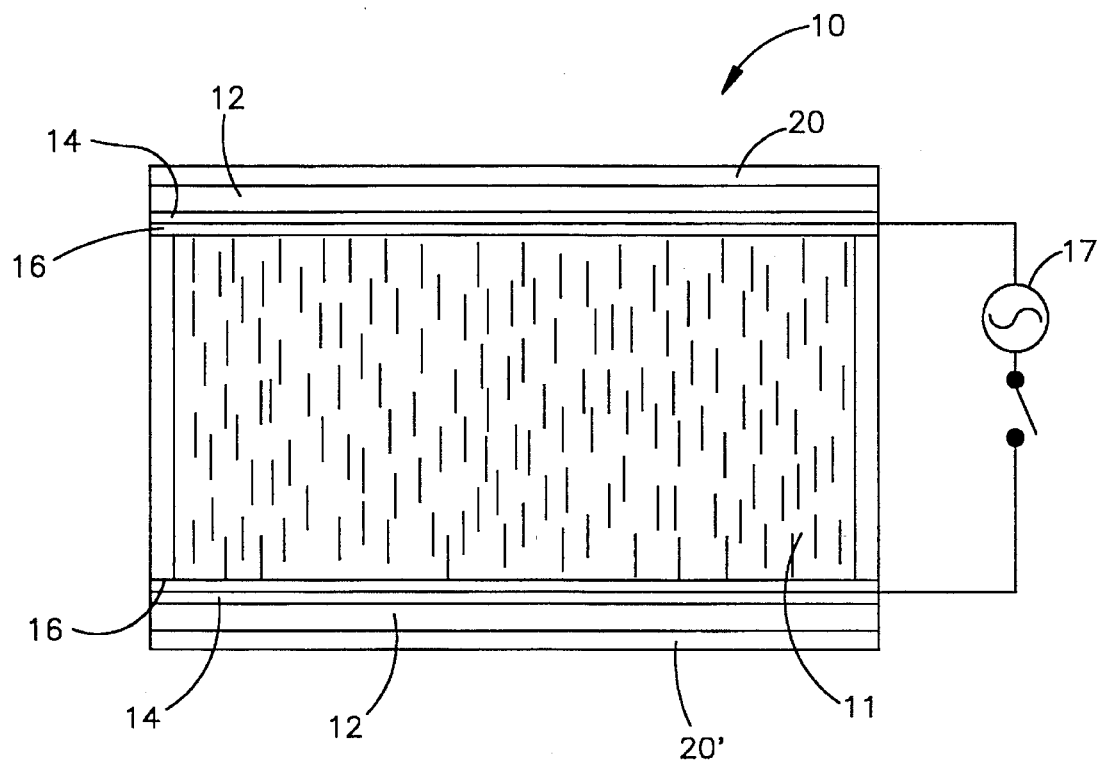
FIG. 1 is a stylized diagrammatic cross-section of a cell according to the invention in the field-off condition.
Figure 2:
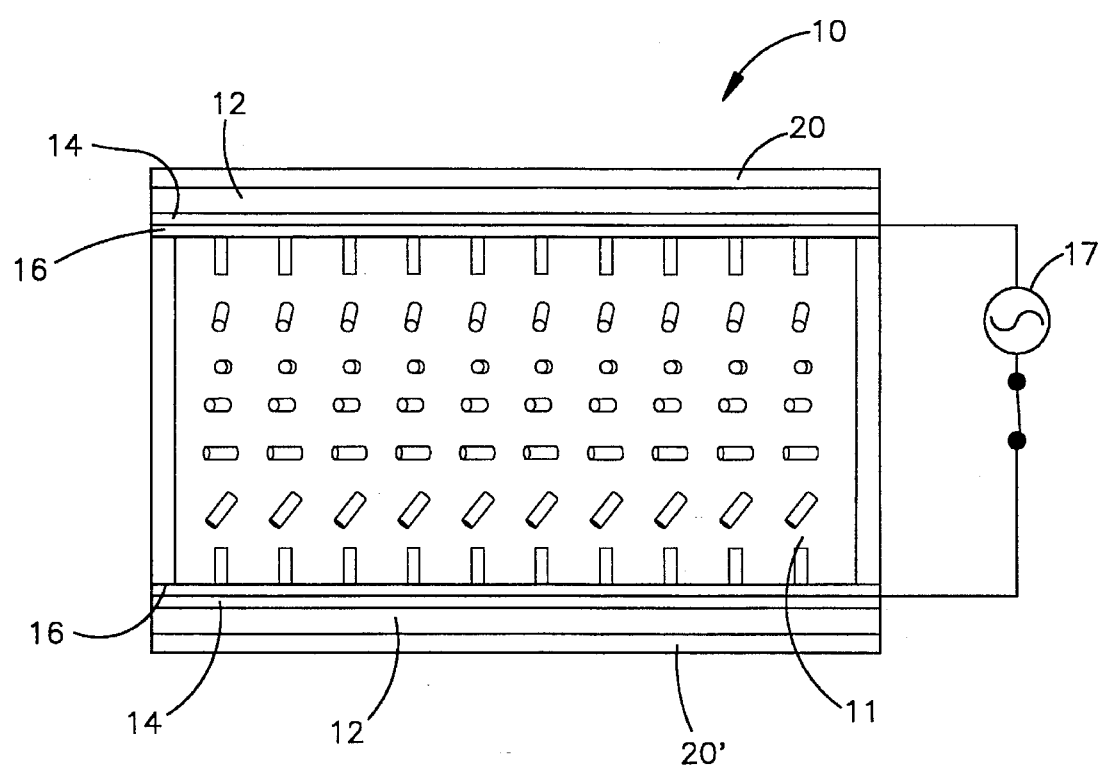
FIG. 2 is a stylized diagrammatic cross-section of a cell according to the invention in the field-on condition.

FIGS. 1 and 2 are diagrammatic cross sections of a liquid crystal cell 10 according to the invention above and below the threshold voltage $V_{th}$, respectively. Liquid crystal 11 is contained between glass slides 12 coated with indium-tin-oxide (ITO) 14 to serve as electrodes. A layer of surfactant 16 is deposited on the ITO to induce homeotropic alignment of the liquid crystal molecules 18. Crossed polarizers 20, 20' are placed on the outside of the cell walls 12, and an a.c. voltage source 17 is connected to the cell to apply a voltage across the cell using the ITO electrodes.

FIG. 1 shows the cell in the field-off condition where $V<V_{th}$. In this condition the molecular director remain parallel to the cell normal throughout the cell. Light incident along the cell normal is polarized by a polarizer 20 or 20'. Since the propagation direction remains parallel to the liquid crystal director, there is no birefringence and hence no optical retardation. The light remains polarized as it exits the cell, and is absorbed by the opposite polarizer 20 or 20', which is crossed with respect to the first polarizer giving rise to extinction. For oblique incidence the light traverses the liquid crystal at an angle relative to the molecular director and therefore some retardation occurs. In this case some light will pass through the crossed polarizer giving rise to a reduced contrast ratio at oblique angles. FIG. 2 shows the cell in the field-on condition where $V>V_{th}$. In this condition the molecules attempt to align parallel to the cell walls, i.e., perpendicular to the electric field which is applied in the direction of the cell normal.

Figure 3A:
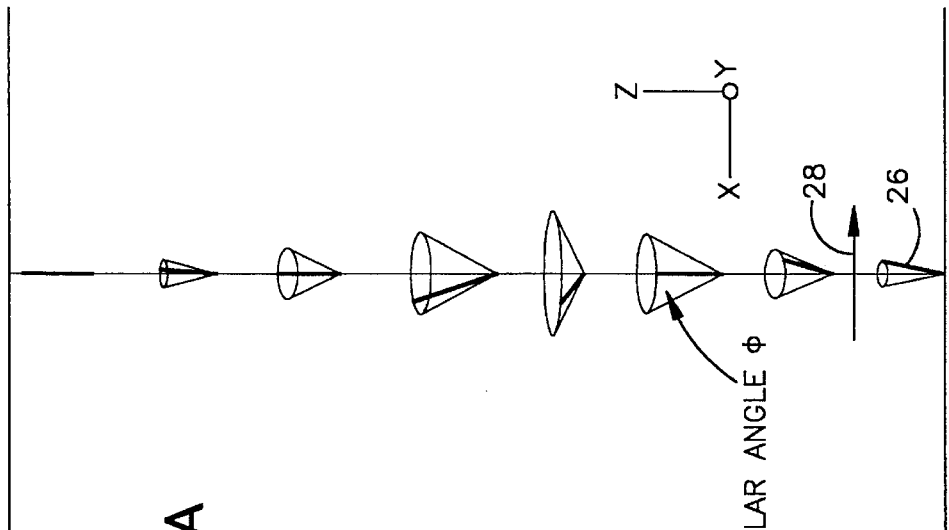
FIG. 3A is a conceptual representation of a preferential azimuthal orientation of a liquid crystal molecule at a surface of a cell according to the invention in the presence of a field.
Figure 3:
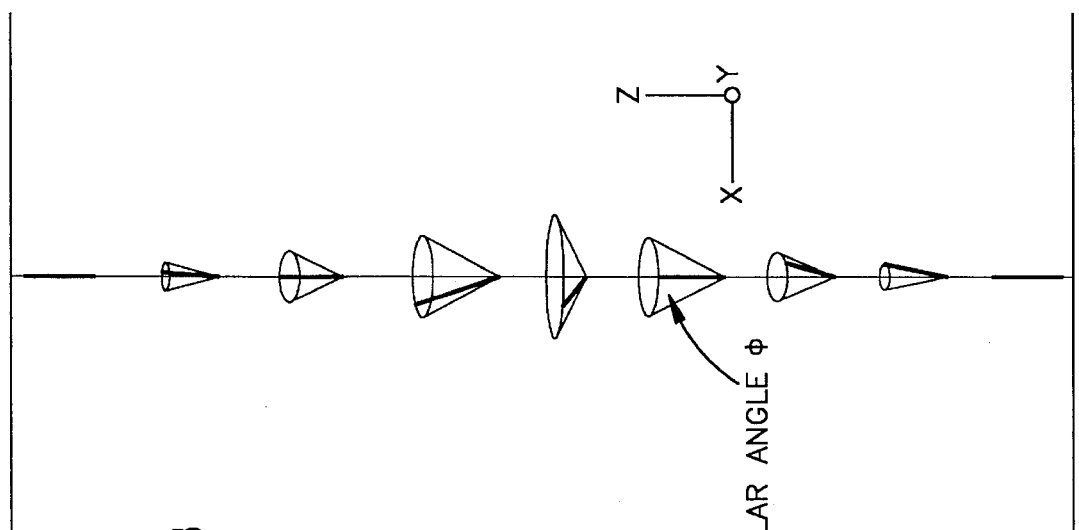
FIG. 3 is a conceptual representation of the orientation of the liquid crystal across the thickness of the cell in the presence of a field.

FIG. 3 is a conceptual representation of the molecular orientation as a function of position along the cell normal for $V>V_{th}$. The molecules at the surfaces lie parallel to the cell normal as shown. Polar tilt φ increases into the bulk interior of the cell, reaching a maximum at the center where the molecules lie more or less parallel to the cell walls. Additionally, the molecule precesses about a helical axis parallel to the cell normal, which is referred to as the azimuthal angle Θ. For sufficiently long pitch, large molecular birefringence and large polar tilts, such as when the voltage V is substantially larger than $V_{th}$, the effective birefringence experienced by the light propagating along the cell normal is large. This approaches the "adiabatic limit" in which the optical electric field vector rotates about the helix, i.e., follows the molecular director. In this condition the initial azimuthal angle near the surfaces, which varies randomly with the position on the cell surface, will not significantly effect the perceived transmission of light.

Since the propagation of light through the cell depends on the refractive indices, the director's local polar tilt angle, helical pitch, the sample thickness and the viewing angle, it is clear that the performance of a cell depends critically on a multitude of adjustable parameters. The inventors have discovered the parameters for cell thickness relative the pitch of the chiral liquid crystal to obtain an excellent high contrast shutter and to minimize the threshold voltage.

The threshold voltage is a function of the pitch to thickness ratio. With a chiral nematic liquid crystal having negative dielectric anisotropy $\Delta X<0$ and a pitch $P_{bulk}$ in the bulk given by $P_{bulk}=2\pi/q_o$, the free energy is given by formula (1) as follows:

$$F=\tfrac{1}{2}K_{33}(\hat{n}\times\nabla\times\hat{n})^2+\tfrac{1}{2}K_{22}(\hat{n}\cdot\nabla\times\hat{n}-q_o)^2-\tfrac{1}{2}\Delta\chi(\bar{E}\cdot\hat{n})^2, \qquad (1)$$

where $K_{22}$ and $K_{33}$ are the twist and bend elastic moduli, respectively, n is the director, and E is the applied electric field. For a sufficiently thin cell treated for homeotropic alignment, where the cell thickness (d) is somewhat smaller than the pitch, and in the absence of an electric field, the helix unwinds and the director are normal to the cell surfaces throughout the cell. Taking the direction normal to the surface as z, with the x and y directions in the plane of the cell, an electric field along z will tend to rotate the director so that E⊥n. This effect will compete with the bend elastic term which tends to maintain a uniform director. Assuming small deviations of the director away from z, the Cartesian components of a liquid crystal director in the cell are given by formula (2) as follows:

$$n_x = \sin\phi \sin\Theta \approx \phi \sin\Theta$$

$$n_y = \sin\phi \cos\Theta \approx \phi \cos\Theta$$

$$n_z = \cos\phi \approx 1 \tag{2}$$

where $\phi$ is the polar angle from the z axis and $\Theta$ is the azimuthal angle in the x-y plane. In terms of $\phi$ and $\Theta$ the free energy becomes:

$$F = 1/2 K_{33}\left[\left(\frac{d}{dz}(\phi\sin\Theta)\right)^2 + \left(\frac{d}{dz}(\phi\cos\Theta)\right)^2\right] + \tag{3}$$

$$1/2 K_{22}\left(\phi^2 \frac{d\Theta}{dz} - q_o\right)^2 + 1/2\Delta\chi E^2\phi^2$$

In the absence of chirality the $K_{22}$ term vanishes. Below a certain threshold field the bend elastic term dominates the free energy, which is minimized for $\phi=0$, and the sample remains uniform. Above the threshold voltage the electric field term becomes important, F is minimized for $\phi\neq0$, and the director rotates so that it is no longer parallel to the field. This is the usual Freedericksz transition in a negative dielectric anisotropy material. However, chirality introduces an additional term proportional to $K_{22}$. Since a cholesteric is helical in its ground state, the sample can reduce its free energy by twisting. Although this is impossible for a uniform homeotropic, a twist can be achieved if a small amount of bend is introduced. The director would then rotate about a cone from one surface of the cell to the other as shown in FIG. 3. Chirality favors a nonzero $\phi$. On applying the Euler-Lagrange equation for $\Theta$ to the free energy in Equation 3, it is seen that for the helical structure that $$\frac{d\Theta}{dz} = \frac{K_{22}q_o}{K_{33}},$$

corresponding to a pitch $$P = \frac{2\pi K_{33}}{K_{22}q_o}.$$

It should be noted that assumption that the pitch is independent of the polar angle $\phi$ applies only for small $\phi$ when the approximations of Equation (2) hold. On substituting the lowest-energy fourier component $\phi=\phi_{q1} \sin q_1 z$ into Equation (3), where $q_1 = \pi/d$, one obtains:

$$F_{q_1} = \left[1/2 K_{33}q_1^2 + 1/2 K_{33}\left(\frac{K_{22}q_0}{K_{33}}\right)^2 - \right. \tag{4}$$

$$\left. K_{22}q_o\left(\frac{K_{22}q_0}{K_{33}}\right) + 1/2\Delta\chi E^2\right]\phi_{q_1}^2$$

Noting that the anisotropy is negative and voltage V=Ed, one obtains an expression of the Freedericksz threshold voltage:

$$V_{th}^2 = \frac{\pi^2}{-\Delta\chi}\left(K_{33} - \frac{K_{22}^2 t^2 q_o^2}{K_{33}\pi^2}\right) \tag{5}$$

Equation (5) suggests that for a sufficiently thick cell the threshold voltage vanishes. This occurs at a critical thickness $$t_c = \frac{K_{33}\pi}{K_{22}q_o}.$$

Since $K_{33}$ is typically about $3K_{22}$, the critical thickness $d_c$ is approximately 3/2 the pitch $P_{bulk}$ of the bulk liquid crystal. This condition generally does not provide maximum contrast however. Improved contrast can be obtained by reducing the chiral dopant, with a concomitant increase in $V_{th}$.

Thus, by providing a cell with appropriate thickness and a sufficiently low amount of chiral material to allow the liquid crystal to homeotropically align in the absence of a field, one obtains an excellent light shutter according to the invention. Specifically, if one adopts this geometry for a flat panel display the field-off condition appears very dark between crossed polarizers. Above the threshold voltage, where $\phi\neq0$ and the director has a finite pitch $d\Theta/dz$, one has a combination of ordinary birefringence and rotation of the optical electric field vector. Light will be transmitted through the polarizers and the pixel will appear bright in the field-on condition. When the voltage is just above $V_{th}$ the polar tilt of the molecules is relatively small, and the effective birefringence seen by the light is commensurately small. In consequence the device operates primarily as a retardation cell.

Without a preferential easy axis for azimuthal orientation, $\Theta$ can wander from point to point across the face of the cell giving rise to unwanted texture. However, for appropriate voltages above the threshold voltage the polar tilt $\phi$ is close to $\pi/2$ over most of the cell, and the device can operate near the adiabatic limit as a combination retardation and rotation cell. Nearly uniform brightness is obtained because the transmission of light depends upon the total azimuthal rotation $\Theta$ of the optical electric field vector as well as retardation. Accordingly, $\Theta \approx \pi/2$ (90°) tends to give maximum transmission, whereas a cell thickness of approximately 3/2 the pitch gives the minimum threshold voltage. Of course, transmission in a voltage-on state for a given rotation is approximately symmetrical about 90° (it is exactly symmetrical in the adiabatic limit when the pitch equals four times the thickness). Thus, useful effects may be obtained with rotations ranging from about 30° to about 150° depending on the cell and the use to which it is put. Moreover, when there is no preferential azimuthal orientation, and hence the possibility of two eigenmodes, maximum transmission for a given cell obtains when the above-noted condition of $\Theta \approx \pi/2$ is met and the cell thickness is adjusted such that the phase shift between the eigenmodes is an integral multiple of 360°, i.e., $2\pi$, according to the formula $$\int_o^d 2\pi/\lambda\, \Delta n_{eff}(z) dz \approx 2\pi,$$

$2\pi/\lambda\, \Delta n_{eff}(z)dz \approx 2\pi$, where $\Delta n_{eff}$ is the effective birefringence and d is the cell thickness.

EXAMPLE 1

A cell composed of glass plates coated with ITO and the surfactant HTAB was fabricated by first gently depositing a small quantity of 7 μm diameter glass rods (typical length approximately 20 μm) uniformly on the surface of one of the plates. A second glass plate was placed face down on the first plate and held in place by a vacuum. The cell was then sealed with U.V. curable epoxy. Spacing uniformity was determined to be approximately 7±0.5 μm over the face of the 2 cm×2 cm cell. Self-sticking crossed polarizers were placed on the outside surfaces of the cell walls, and the cell was then filled at room temperature with a mixture of CB15 chiral material and ZLI-2806 nematic liquid crystal. The CB15 is present in an amount of 0.99% by weight based on the combined weight of chiral material and nematic liquid crystal, producing a $P_{bulk}$ of approximately 17 μm based on manufacturer's specifications. ZLI-2806 has a dielectric susceptibility anisotropy of approximately −0.38 and a birefringence of 0.044. This results in a product dΔn for this cell of 0.31 μm. Both materials are available from E. Merck.

At room temperature the sample was viewed under an optical microscope, where excellent, defect-free homeotropic alignment was observed. On applying an a.c. voltage at 60 Hz, the material began to exhibit a Schlieren-like texture at 1.75 V rms where the transmission from the cell was not uniform. As the voltage was increased the cell became uniformly bright under crossed polarizers at approximately 3 V.

The cell was then placed in the path of a beam from an He-Ne laser operating at wavelength λ=6328 Å. At this wavelength the retardation ($\alpha=2\pi/\lambda(d\Delta n)$) of this material is 175°. The beam passed consecutively through the first polarizer, the sample, the second, crossed polarizer, a light chopper and into a photodiode detector. The detector output was fed into a lock-in amplifier which was referenced at the 317 Hz chopping frequency. The output from the lock-in amplifier, which is proportional to the intensity of light at the detector, was measured with a digital voltmeter.

Figure 4:
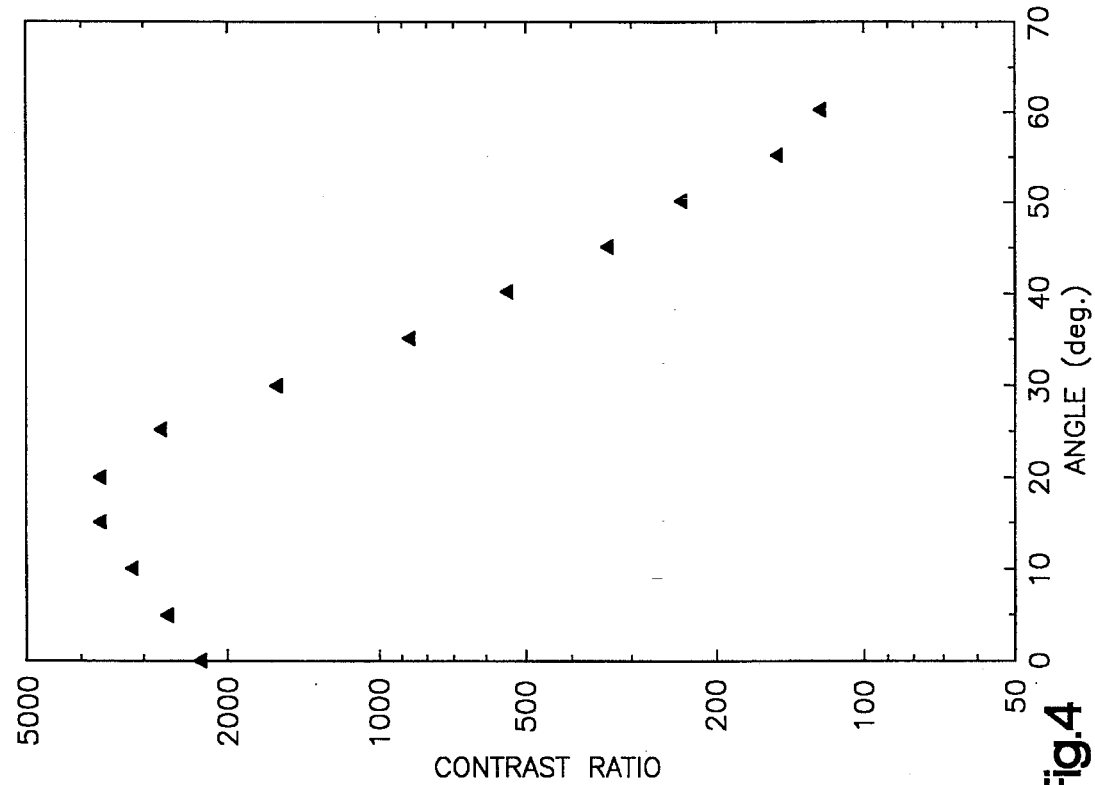

The intensity of light at normal incidence with zero voltage applied to the sample was first measured and then a 3 V rms, 60 Hz potential was applied to the cell and the intensity again measured. The contrast ratio was taken to be the I(V=3 V)/I(V=0). The transmission of the cell was determined by measuring the transmitted intensity of normally incident He-Ne laser light with the cell in the field-on condition at 3 V. This intensity was divided by the intensity of light through a piece of indium-tin-oxide coated glass slide placed between two parallel polarizers. This latter measurement approximately models the ideal transmission through the cell. A transmission of 20% was obtained for this example. The cell was then rotated about an axis parallel to the polarizer and in the plane of the sample, and the contrast ratio again measured. This process was repeated at rotation angles up to 60°, and the results are plotted and shown in FIG. 4. As can be seen from FIG. 4, the cell exhibited excellent contrast, above 2000:1 out to 20° and remaining above 100:1 out to 60°.

Figure 5:
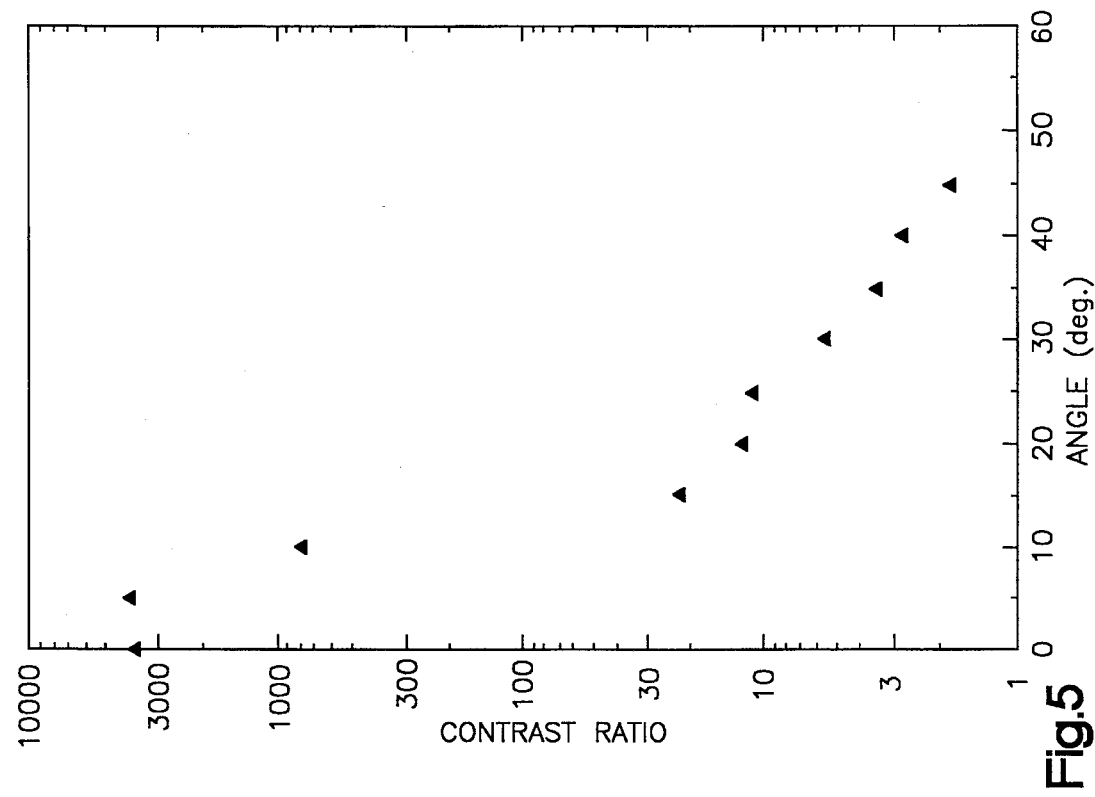
FIGS. 4 and 5 are plots of the contrast ratio exhibited by a cell according to the invention relative to varying angles of incidence of light on the cell.

The cell was then reoriented so that the axis of rotation was at 45° with respect to the polarizer and in the plane of the cell. FIG. 5 shows the contrast ratio. At viewing angles above 25° the contrast becomes rather poor, due largely to an increasing transmission in the field-off state for oblique transmission through the cell. Here the optical polarization is a mixture of ordinary and extraordinary, thus allowing for retardation in the field-off state at oblique incidence. This is contrasted with the results shown in FIG. 4 where the optical polarization was either purely extraordinary or purely ordinary for oblique incidence, and thus there was little or no transmission through the crossed polarizer in the field-off state.

Figure 6:
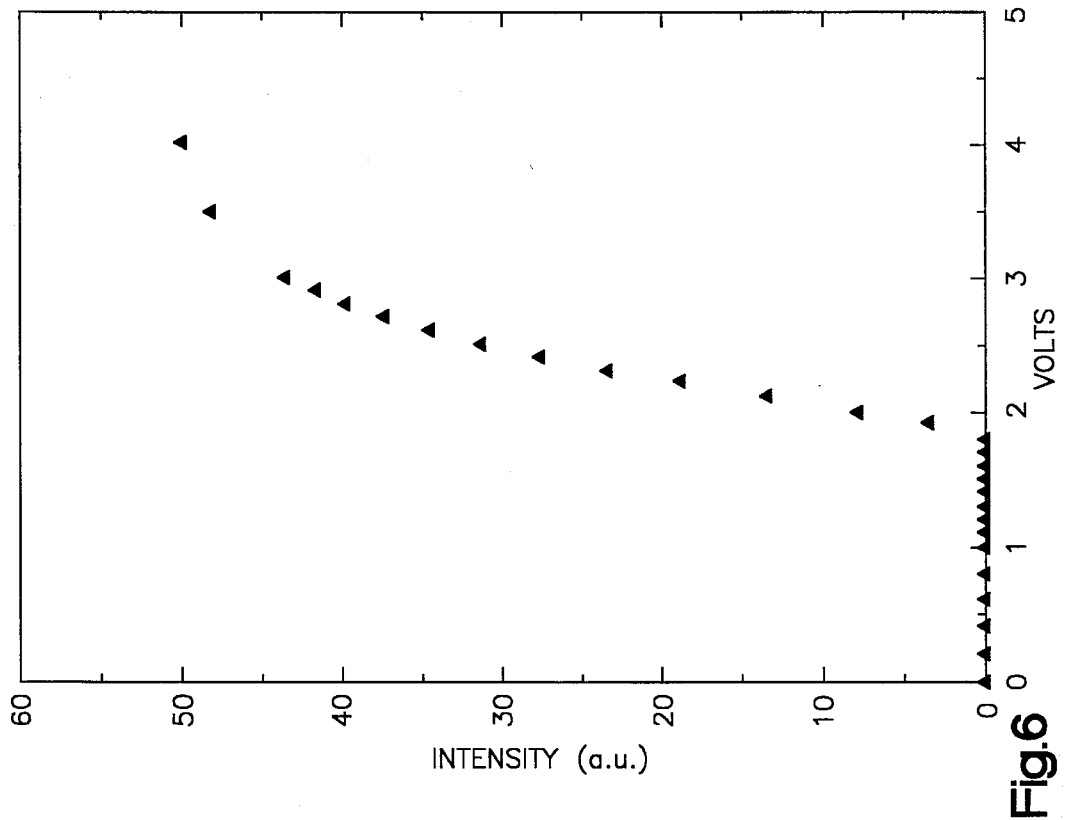
FIG. 6 is a plot of the transmission from a cell according to the invention in response to applied voltage.

The cell was then rotated back to normal incidence, and the intensity of transmitted laser light was measured as a function of applied voltage. The results of this test are shown in FIG. 6. Here all results were found to be independent of driving frequency in the range of 60 Hz<v<10,000 Hz. Lower frequencies were not examined. The threshold voltage $V_{th}$ was found to be 1.75 V, and the voltage ratio for I(90%)/I(10%) was approximately 1.45.

The rise and fall times of the transmitted intensity were determined by switching the a.c. voltage on and off with a toggle switch and observing the signal using a digital storage oscilloscope. After turning on a 3 V rms potential there was an approximately 200 ms delay before the intensity began to increase, followed by a 150 ms rise to 90% of maximum intensity. On switching off the voltage the transmitted intensity began to decay immediately, falling to 10% of the maximum in approximately 70 ms. For a 3.6 V signal, there was no delay for the intensity to rise and the intensity rose approximately linearly over 300 ms to 90% of its maximum value.

Figure 7:
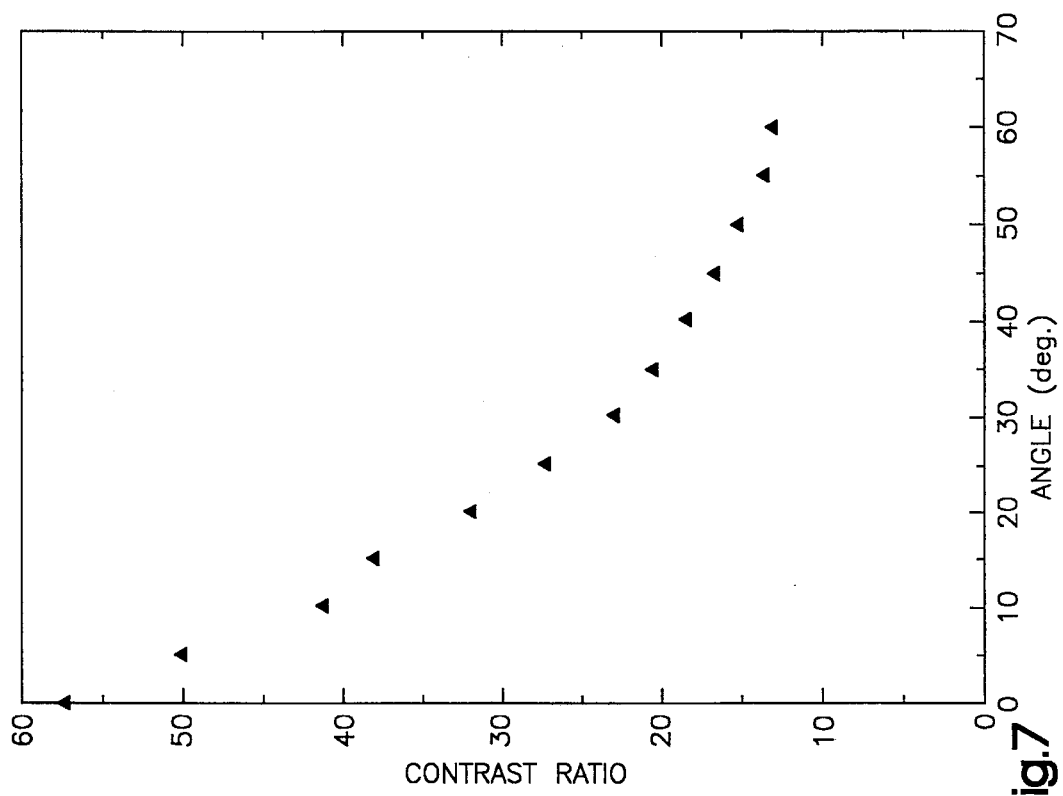
FIG. 7 is a plot of the contrast ratio exhibited by a cell according to the invention for diffuse incident light relative to varying angles of incidence.

The laser was then expanded to about a 2 cm diameter spot at the cell. In front of the cell was placed a piece of ground glass to diffuse the light, followed by a 0.8 cm diameter mask. Directly behind the cell, a distance of about 0.6 cm, was placed a wide area detector having an acceptance area of about 1 cm². No light chopper was used. Here the contrast ratio I(V=3 V)/I(V=0) was measured as a function of angle. The results are shown in FIG. 7. For normal incidence a contrast ratio greater than about 50:1 was achieved. At 60° incidence the contrast ratio was greater than about 10:1.

EXAMPLE 2

Figure 9:
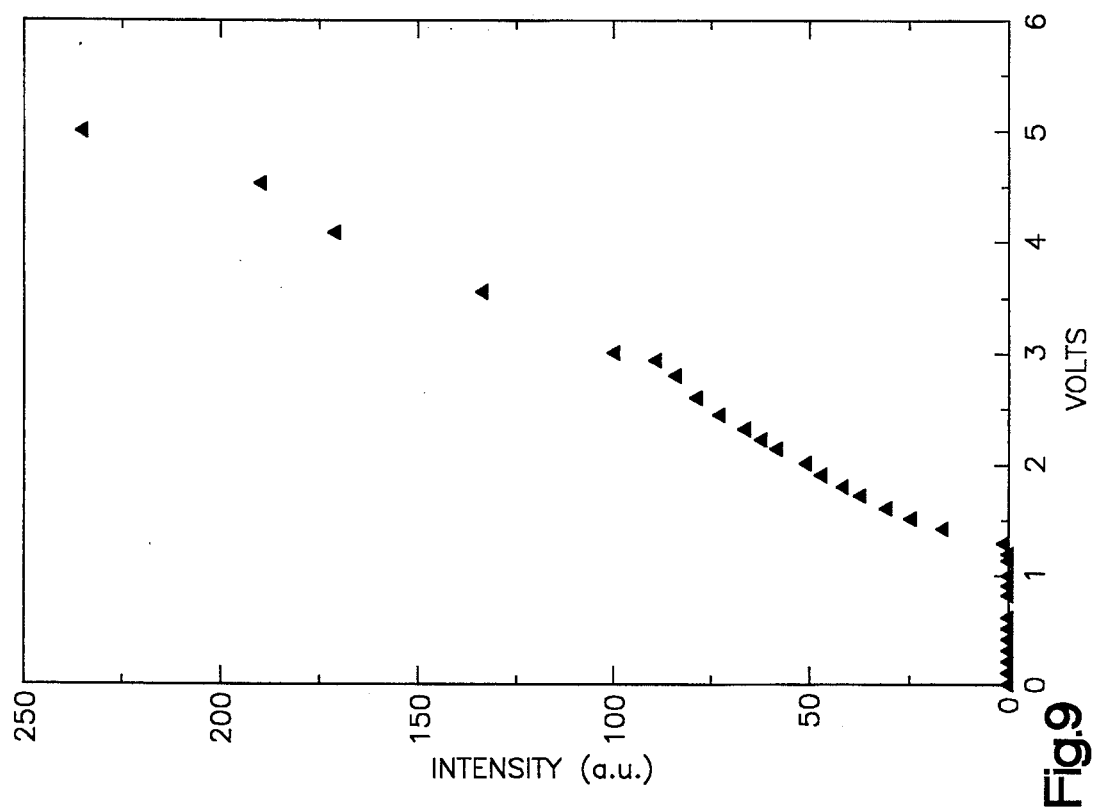
FIG. 9 is a plot of the transmission of the cell from FIG. 8 in response to applied voltage.
Figure 8:
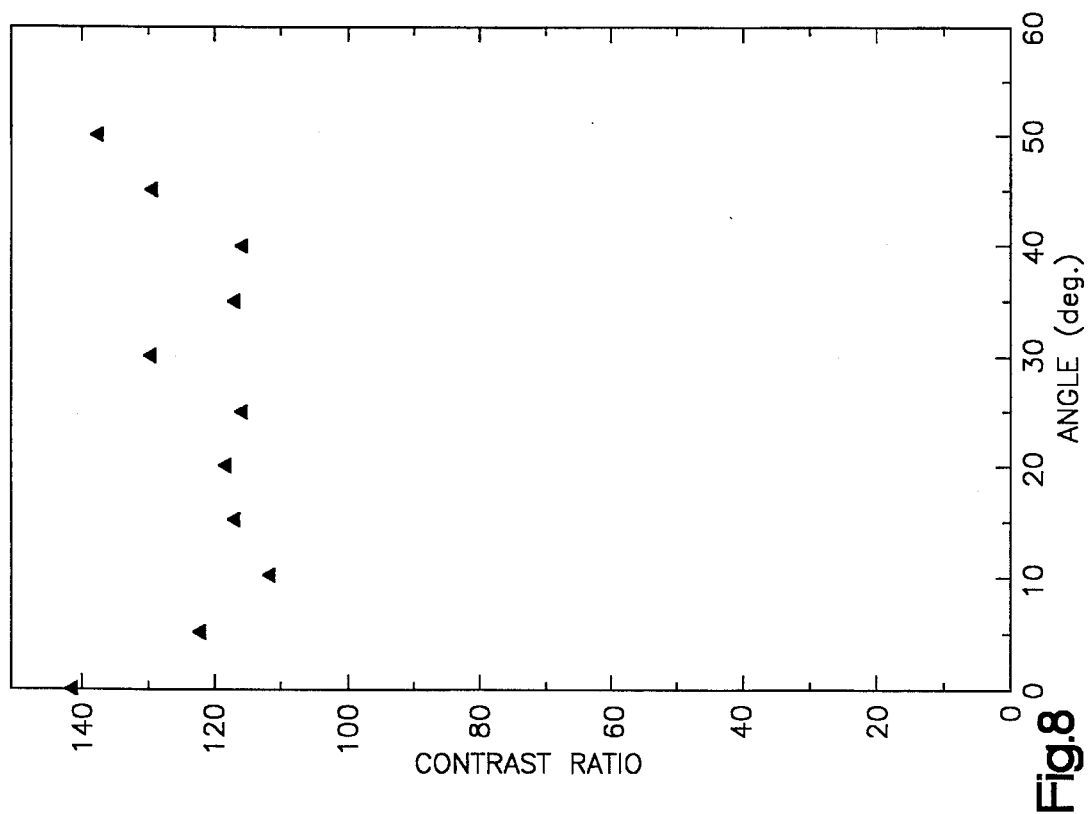
FIG. 8 is a plot of the contrast ratio exhibited by another cell according to the invention relative to varying angles of incidence of light on the cell.
Figure 10:
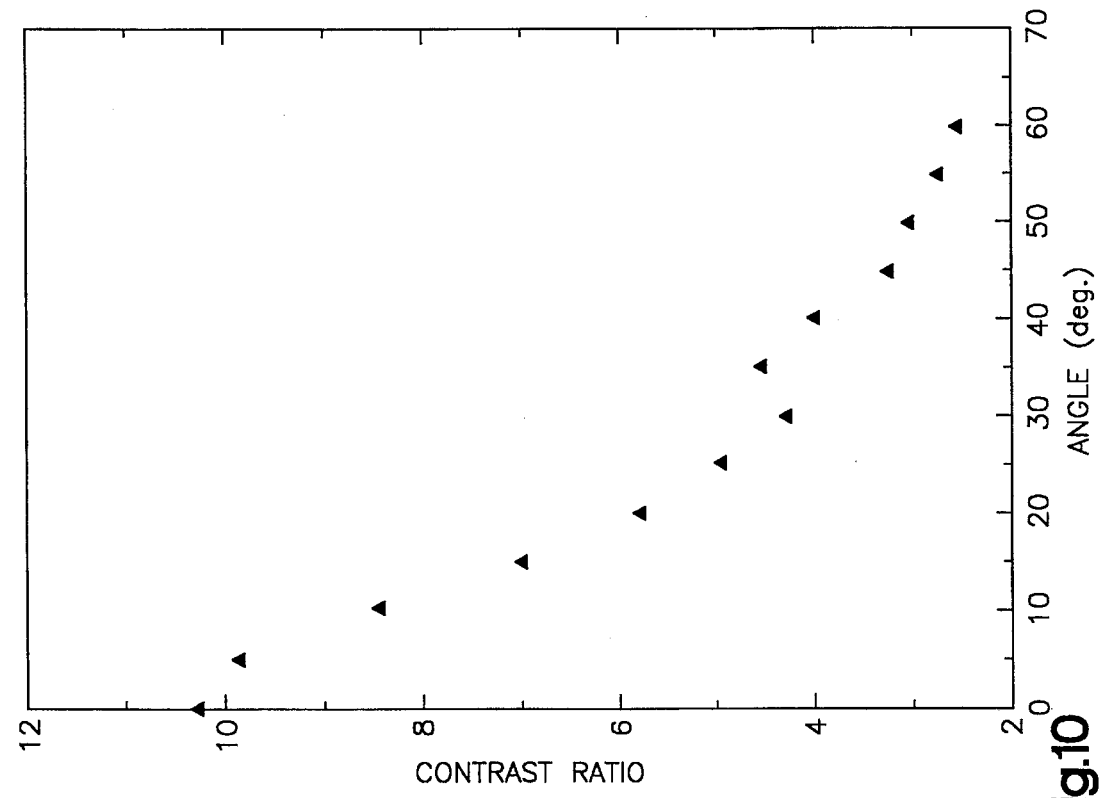
FIG. 10 is a plot of the contrast ratio exhibited by the cell from FIG. 8 for diffuse incident light relative to varying angles of incidence.
Figure 13:
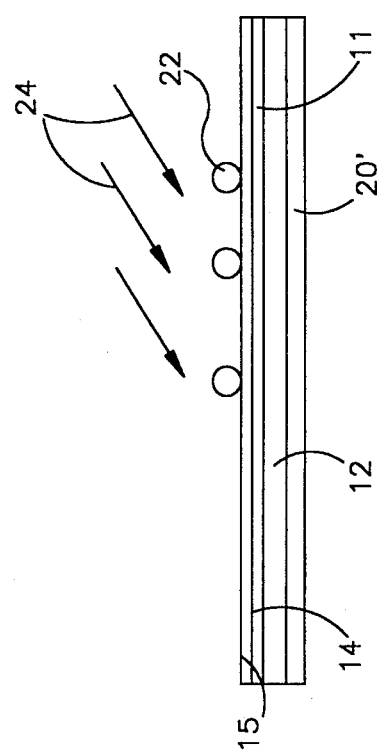
FIG. 13 is a conceptual representation of the application of glass spacers across a surface of a cell by oblique blowing of freon.

A cell was prepared in the manner described in the previous example wherein the liquid crystal material was a mixture containing 1.65% by weight CB15 in ZLI-2806. The contrast ratio and intensity versus voltage experiments described in the preceding example were conducted on this cell. Although the contrast ratio, shown in FIG. 8 for the He-Ne laser light was reduced from the lower chirality material used in Example 1, this cell still exhibited contrast ratios above 100:1 out to an angle of 55°. The reduction in contrast ratio exhibited by this cell is due to the tighter pitch which results in an optical rotation somewhat greater than π/2 so that much of the light cannot pass through the crossed polarizer. Interestingly, the contrast ratio showed a peak when the incidence angle was approximately 40° from the normal. The intensity versus voltage for normally incident light was measured and the results are shown in FIG. 9. As expected for this more highly chiral material, the threshold voltage is smaller than that for the material in Example 1 and was about 1.25 V. As with the material in the preceding example there was a slow rise in intensity above $V_{th}$, but with this material textures were still observable at voltages below about 3 V. This is because the cell had not yet reached its adiabatic limit. FIG. 10 shows the contrast ratio of this cell for diffuse He-Ne light. At this higher chirality the contrast ratio was clearly reduced from that shown in FIG. 7 for the material of Example 1.

EXAMPLE 3

A cell was prepared in the manner described in Example 1, except that the cell was filled with a mixture of 1.0% CB15 in ZLI-4330 nematic liquid crystal (E. Merck). This material has a much higher birefringence (Δn=0.147), a somewhat smaller dielectric anisotropy (ΔX=−0.15), and a viscosity less than one third that of the ZLI-2806 of Example 1. The product dΔn for this cell is 1.03 μm. In consequence, the adiabatic limit will be reached for smaller polar tilts, and the retardation will be larger. Due to the lower dielectric anisotropy, the threshold voltage for this cell was about 3.1 V.

Figure 11:
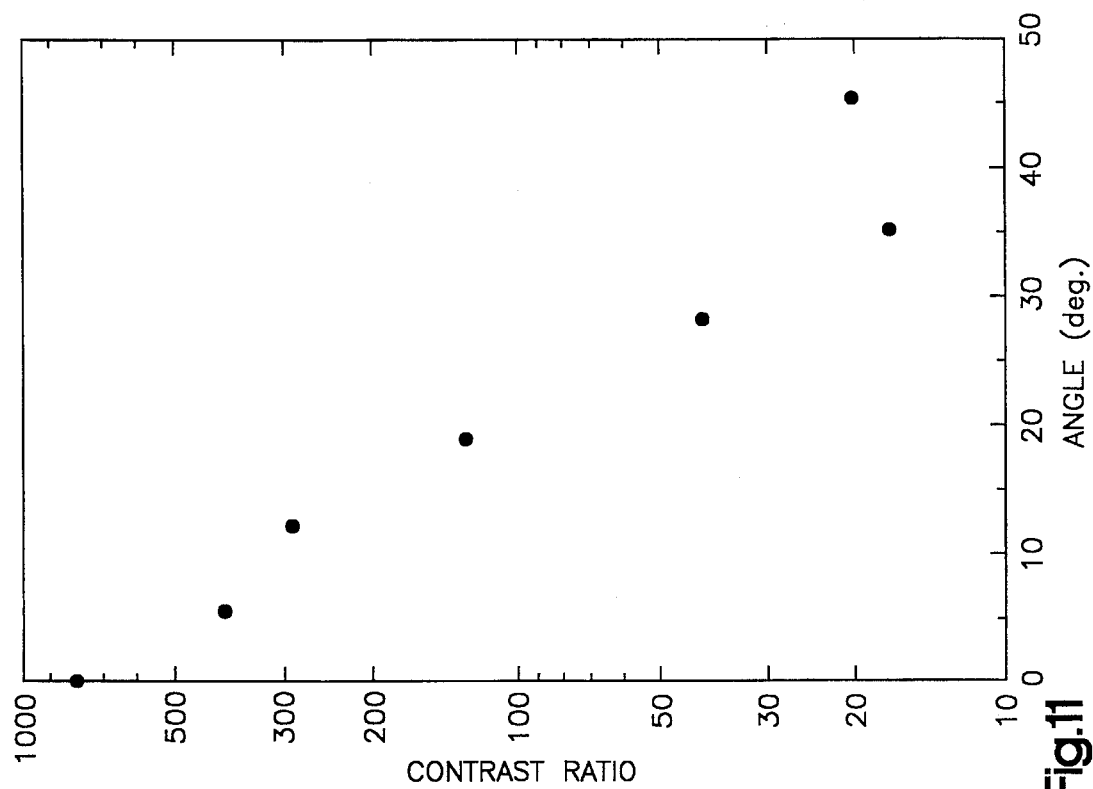
FIG. 11 is a plot of the transmission from another cell according to the invention in response to applied voltage.

Using a field-on voltage of 4 V, the contrast ratio for normally incident He-Ne laser light was approximately 800:1 as shown in FIG. 11. Because of the larger birefringence, the dark state transmitted more light than the material of example 1 at oblique incidence. At an angle of 40° the contrast ratio was about 20, and at 20° the contrast ratio was 80. However, the rapid decrease in contrast ratio with angle could be alleviated with the use of a negative retardation layer or a material with slightly lower birefringence.

The transmission of normally incident He-Ne laser light was at least 85%, largely due to the more nearly complete adiabatic rotation and larger birefringence. With this material retardation α corresponds to approximately 585°. With the much lower viscosity the response time was much faster. The turn on time was on the order of 30 ms, although there is a short delay before the device reacts to the voltage, which depends upon the applied voltage. The turn off time was about 50 ms.

The cell was viewed under a microscope using white light. At 4 V the transmitted light appeared to be white. At higher voltages colors were observed, from yellow to orange to red on increasing the applied voltage. The color effect comes about from preferential retardation of one part of the optical spectrum over another. To minimize texture, the azimuthal orientation of the director at one surface should ideally be at about 45° with respect to the polarizers, giving two eigenmodes of equal amplitude. Additionally, the optical rotation should be 90°. Thus, the combination of high transmission of collimated light and color may be useful in color projection devices.

EXAMPLE 4

Another 7 μm thick cell was constructed as in the preceding examples except that the glass spacers were deposited using freon sprayed obliquely at the surfactant-treated surface. The freon was sprayed from a distance of 40 cm from the glass at an angel of approximately 55° with respect to the substrate normal.

Figure 12:
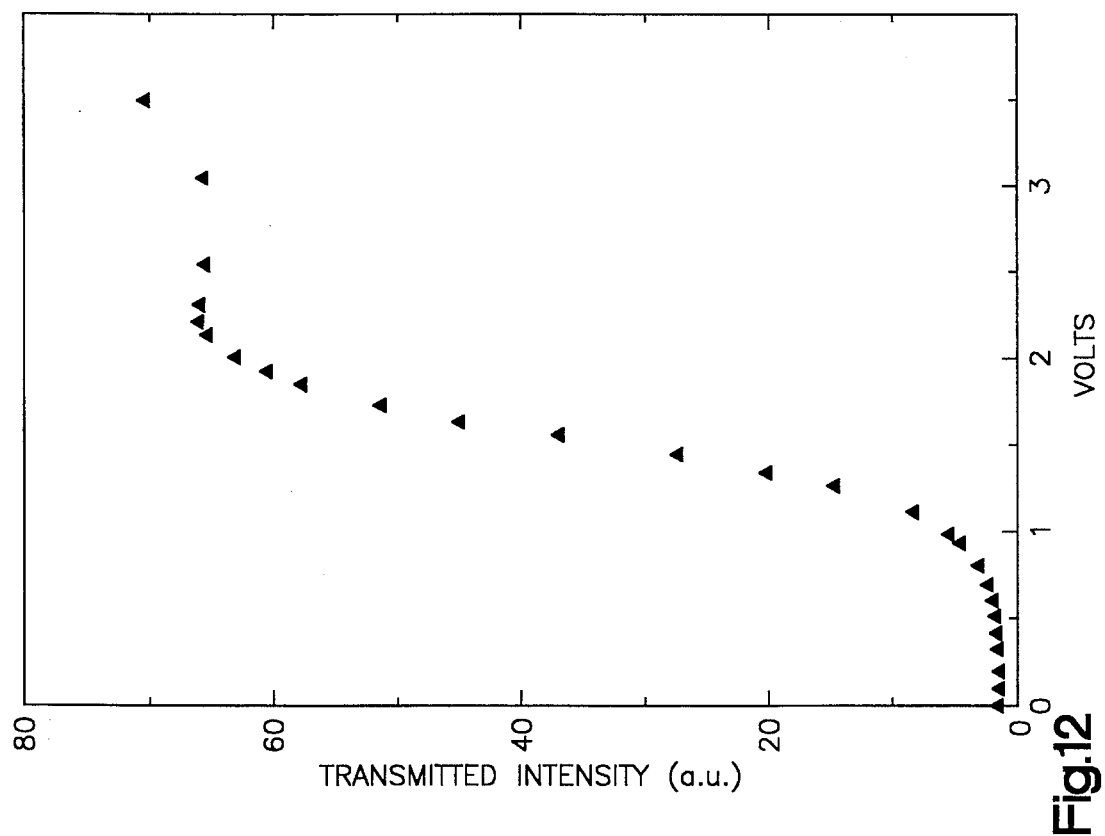
FIG. 12 is a plot of the contrast ratio exhibited by another cell of the invention relative to varying angles of incidence.

The cell was filled with a mixture of CB15 in ZLI-2806 obtained by several dilutions. As a result the precise concentration is not known, although it was likely to be approximately 1.9% by weight CB15 based on the combined weight of CB15 and ZLI-2806. This concentration is approximated from the $V_{th}$ being only 0.35 V. Using optical microscopy a uniform homeotropic texture at zero field was observed, although there were several defects present where presumably a large freon drop hit the surface and disrupted the HTAB surfactant. For $V>V_{th}$ there was only a small amount of texturing observed just above the threshold voltage. Instead, a few striped more or less parallel dark domains approximately 100 μm long were seen running along the length of the sample in an otherwise uniformly bright background. The contrast between the darker stripes and brighter background decreased as the voltage increased. It is believed that the freon treatment was responsible for the uniform background and that the stripes may be due to larger droplets of freon or glass rods skidding across the surface. Ultimately this effect may prove useful in providing an easy-axis for azimuthal orientation, thereby eliminating the domain structure or texture at voltages just above $V_{th}$ and permitting grey scale application. FIG. 3A conceptually shows the preferential azimuthal orientation of a liquid crystal molecule 26 at a surface of the cell in the direction of arrow 28 in the plane of the paper. FIG. 12 shows the intensity versus voltage trace for collimated normally incident He-Ne light. The maximum contrast ratio was approximately 50:1, continuing to decrease in contrast as the concentration at which $V_{th}$ goes to zero is approached.

Many modifications and variations of the invention will be apparent to those of ordinary skill in the art in light of the foregoing disclosure. For example, the turn-on time can be improved and optimized by using thinner cells, lower viscosity materials and by adjusting the elastic constant to viscosity ratio, as by adding appropriate polymeric liquid crystals to the mixture. Turn-off times can also be improved by similar methods, and by using materials whose sign of dielectric anisotropy is frequency dependent. Similarly, the threshold voltage, and the optics above it, can be adjusted by changing the ratio of bend to twist elastic constant, as by doping with polymer. Therefore, it is to be understood that, within the scope of the appended claims, the invention can be practiced otherwise than has been specifically shown and described.

What is claimed is:

1. A liquid crystal display device comprising:
    a) first and second polarizers, each of said polarizers having respective polarization orientations and being oriented to pass a polarization of light substantially perpendicular to the polarization of light passed by the other of said polarizers, and means for applying an electric field in said liquid crystal;
    b) cell walls having respective opposing inner surfaces disposed between said first and second polarizers and a chiral nematic liquid crystal material disposed between said inner surfaces of said cell walls, said inner surfaces being unrubbed and at least one of said inner surfaces being treated to promote only homeotropic alignment of said liquid crystal material; and,
    c) said chiral nematic liquid crystal having negative dielectric anisotropy and including a sufficiently low amount of chiral material to enable the liquid crystal director to homeotropically align in the absence of a field.

2. A liquid crystal device according to claim 1 wherein said liquid crystal material includes chiral material in an amount sufficient to produce a pitch length effective to rotate the polarization of light passing through the cell by from approximately 90° to approximately 150° in the presence of a field.

3. A liquid crystal device according to claim 1 wherein said liquid crystal material includes chiral material in an amount sufficient to produce a pitch length effective to rotate the polarization of light passing through the cell by from approximately 30° to approximately 150° in the presence of a field.

4. The liquid crystal device according to claim 1 wherein said chiral nematic liquid crystal includes chiral material in an amount sufficient to produce a pitch length in said liquid crystal of from about 2.4 to about 4.0 times the thickness of the cell in the presence of a field.

5. The liquid crystal device according to claim 1 wherein said chiral nematic liquid crystal includes chiral material in an amount sufficient to produce a pitch length in said liquid crystal that is from about 2.4 times the thickness of the cell to about 12 times the thickness of the cell in the presence of a field.

6. A liquid crystal display device comprising:
    a) first and second polarizers, each of said polarizers having respective polarization orientations and being oriented to pass a polarization of light substantially perpendicular to the polarization of light passed by the other of said polarizers, and means for applying an electric field in said liquid crystal;

b) cell walls having respective opposing inner surfaces disposed between said first and second polarizers and a chiral nematic liquid crystal material disposed between said inner surfaces of said cell walls, said inner surfaces being unrubbed and at least one of said cell walls including a treatment to promote homeotropic alignment of said liquid crystal material; and, c) said chiral nematic liquid crystal having negative dielectric anisotropy and including a sufficiently low amount of chiral material to enable the liquid crystal director to homeotropically align in the absence of a field;

wherein said liquid crystal material includes chiral material in an amount sufficient to produce a pitch length effective to rotate the polarization of light passing through the cell by from approximately 90° to approximately 150° in the presence of a field;

wherein at least a portion of light entering said liquid crystal is split into two eigenmodes and said cell walls are spaced apart by a distance effective to produce a phase shift between said eigenmodes that is from approximately 175° to 585° in the presence of a field.

7. A liquid crystal display device comprising:

a) first and second polarizers, each of said polarizers having respective polarization orientations and being oriented to pass a polarization of light substantially perpendicular to the polarization of light passed by the other of said polarizers, and means for applying an electric field in said liquid crystal;

b) cell walls having respective opposing inner surfaces disposed between said first and second polarizers and a chiral nematic liquid crystal material disposed between said inner surfaces of said cell walls, said inner surfaces being unrubbed and at least one of said cell walls including a treatment to promote homeotropic alignment of said liquid crystal material; and, c) said chiral nematic liquid crystal having negative dielectric anisotropy and including a sufficiently low amount of chiral material to enable the liquid crystal director to homeotropically align in the absence of a field;

wherein said liquid crystal material includes chiral material in an amount sufficient to produce a pitch length effective to rotate the polarization of light passing through the cell by from approximately 30° to approximately 150° in the presence of a field;

wherein at least a portion of light entering said liquid crystal is split into two eigenmodes and said cell walls are spaced apart by a distance effective to produce a phase shift between said eigenmodes that is from approximately 175° to 585° in the presence of a field.

8. The liquid crystal device according to claim 6 or 7 wherein said light entering said cell is visible light.

9. A liquid crystal display device comprising:

a) first and second polarizers, each of said polarizers having respective polarization orientations and being oriented to pass a polarization of light substantially perpendicular to the polarization of light passed by the other of said polarizers, and means for applying an electric field in said liquid crystal;

b) cell walls having respective opposing inner surfaces disposed between said first and second polarizers and a chiral nematic liquid crystal material disposed between said inner surfaces of said cell walls, said inner surfaces being unrubbed and at least one of said cell walls including a treatment to promote homeotropic alignment of said liquid crystal material; and, c) said chiral nematic liquid crystal having negative dielectric anisotropy and including a sufficiently low amount of chiral material to enable the liquid crystal director to homeotropically align in the absence of a field;

wherein said chiral nematic liquid crystal includes chiral material in an amount sufficient to produce a pitch length in said liquid crystal of from about 2.4 to about 4.0 times the thickness of the cell in the presence of a field;

wherein light entering said liquid crystal is split into two eigenmodes and said cell walls are spaced apart a distance such that the product of said cell spacing and the optical birefringence of said liquid crystal is between about 0.31 and about 1.03 microns.

10. A liquid crystal display device comprising:

a) first and second polarizers, each of said polarizers having respective polarization orientations and being oriented to pass a polarization of light substantially perpendicular to the polarization of light passed by the other of said polarizers, and means for applying an electric field in said liquid crystal;

b) cell walls having respective opposing inner surfaces disposed between said first and second polarizers and a chiral nematic liquid crystal material disposed between said inner surfaces of said cell walls, said inner surfaces being unrubbed and at least one of said cell walls including a treatment to promote homeotropic alignment of said liquid crystal material; and, c) said chiral nematic liquid crystal having negative dielectric anisotropy and including a sufficiently low amount of chiral material to enable the liquid crystal director to homeotropically align in the absence of a field;

wherein said chiral nematic liquid crystal includes chiral material in an amount sufficient to produce a pitch length in said liquid crystal that is from about 2.4 times the thickness of the cell to about 12 times the thickness of the cell in the presence of a field;

wherein light entering said liquid crystal is split into two eigenmodes and said cell walls are spaced apart a distance such that the product of said cell spacing and optical birefringence of said liquid crystal is between about 0.31 and about 1.03 microns.

11. The liquid crystal device according to claim 9 or 10 wherein said light entering said cell is visible light.

12. A liquid crystal display device comprising:

a) first and second polarizers, each of said polarizers having respective polarization orientations and being oriented to pass a polarization of light substantially perpendicular to the polarization of light passed by the other of said polarizers, and means for applying an electric field in said liquid crystal;

b) cell walls having respective opposing inner surfaces disposed between said first and second polarizers and a chiral nematic liquid crystal material disposed between said inner surfaces of said cell walls, said inner surfaces including a treatment to promote homeotropic alignment of said liquid crystal material in the absence of a field, and at least one of said inner surfaces is treated to promote a preferential azimuthal orientation of adjacent liquid crystal molecules in the presence of a field; and, c) said chiral nematic liquid crystal having negative dielectric anisotropy and including a sufficiently low amount of chiral material to enable the liquid crystal director to homeotropically align in the absence of a field.

13. The liquid crystal device according to claim 12 wherein said liquid crystals have a preferential azimuthal orientation at at least one of said inner surfaces that is approximately parallel to the polarization orientation of one of said polarizing means.

14. A liquid crystal display device comprising:

a) first and second polarizers, each of said polarizers having respective polarization orientations and being oriented to pass a polarization of light substantially perpendicular to the polarization of light passed by the other of said polarizers, and means for applying an electric field in said liquid crystal;

b) cell walls having respective opposing inner surfaces disposed between said first and second polarizers and a chiral nematic liquid crystal material disposed between said inner surfaces of said cell walls, said inner surfaces including a treatment to promote homeotropic alignment of said liquid crystal material in the absence of a field, and at least one of said inner surfaces is treated to promote a preferential azimuthal orientation of adjacent liquid crystal molecules in the presence of a field; and, c) said chiral nematic liquid crystal having negative dielectric anisotropy and including a sufficiently low amount of chiral material to enable the liquid crystal director to homeotropically align in the absence of a field;

wherein said liquid crystals have a preferential azimuthal orientation at at least one of said inner surfaces that is approximately 45° with respect to the polarization orientation of one of said polarizers.

* * * * *